J. COWDY.
Bolt and Nut Lock.
No. 240,387. Patented April 19, 1881.
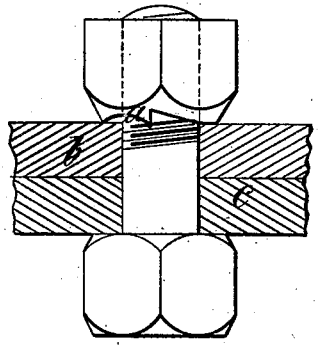
FIG. 1.
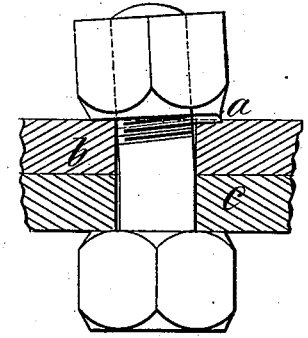
FIG. 3.
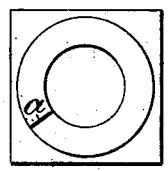
FIG. 2.
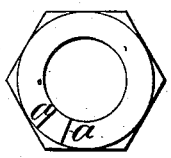
FIG. 7.
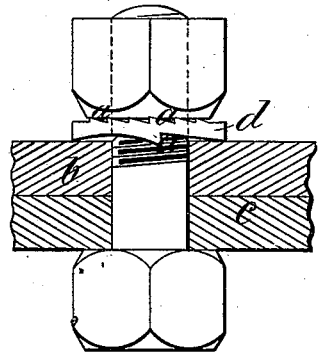
FIG. 5.
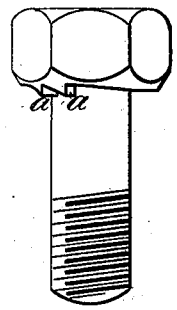
FIG. 8.
FIG. 9.
FIG. 4.
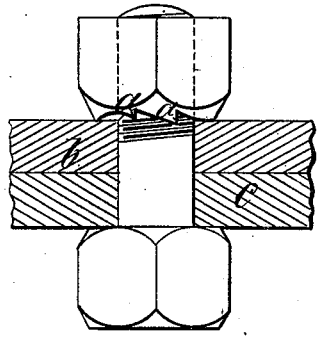
FIG. 6.
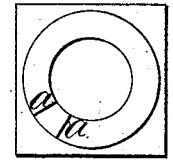
FIG. 10.

UNITED STATES PATENT OFFICE.

JEREMIAH COWDY, OF LONDON, ENGLAND.

BOLT AND NUT LOCK.

SPECIFICATION forming part of Letters Patent No. 240,387, dated April 19, 1881.

Application filed September 16, 1880. (No model.) Patented in England May 2, 1879.

*To all whom it may concern:*

Be it known that I, JEREMIAH COWDY, of the city of London, England, have invented new and useful Improvements in Nuts and Screws, (for which I have obtained a patent in Great Britain, bearing date the 2d May, 1879, No. 1,740,) of which the following is a specification.

It has heretofore been proposed to form the bedding side of bolt-heads and of nuts and screws with a series of peculiarly-formed projecting teeth, equally distributed all around, with the view of preventing the slackening or unscrewing of such bolts, nuts, or screws, which commonly takes place from the jarring or vibration of those parts of a structure or machine in which they are employed. The slackening or unscrewing is prevented by the peculiar form of the teeth, which are so inclined as to hinder or prevent loosening or turning back in one direction, but so as to permit the further tightening up by turning forward or in the opposite direction. These nuts have heretofore usually been made of steel.

Now, the object of this invention is to produce an increased griping action for the purpose aforesaid, and also to decrease the cost of manufacture as compared with the method just referred to.

According to the invention, I produce such increased griping action by forming one tooth—or, say, two or three teeth—of the one-sided description above referred to in one part or portion of the bedding or under side of the nut only, and with the other part plain. I thereby cause a one-sided hold or gripe, tending to strain or very slightly bend the bolt or screw or to cant it in its hole. The rise of the inclined side of the tooth may be very gradual, or, as it were, screw-shaped. The other side is vertical or of a slight inward incline.

When a washer under the nut is required or desirable—say because of a too large or uneven hole or uneven bedding-surface—I make the under side of such washer with three or more equidistant teeth, so as to make an even gripe or bearing, and I make a part of the other or upper side of a number of finer teeth, which bed themselves into the nut. For screws which are fastened into tapped holes, I form the under or bedding side of the head similarly with one tooth—or, say, two teeth—in one place or portion of the same.

The nut or the screw-head, on the side of the same which is formed with the tooth, (or teeth,) is to be of a harder substance or surface than the material against which it acts to bed itself, so that the tooth (or teeth) may, to a certain extent, embed or indent itself therein.

This invention is particularly applicable to the fastening of fish-plates to rails or girder-sleepers.

Figure 1 of the accompanying drawings is a side elevation of a bolt fitted with a nut made according to this invention, the clamped material being in section.

Fig. 2 is a plan of the under side of the nut. The tooth $a$ is placed near one corner, where the nut is strongest, and has in this case an incline of about one-fourth the circumference, the rest of the end surface of the nut being level.

Fig. 3 is an elevation of the same bolt and nut, showing the mode of action, but rather exaggerated, the tooth, while more or less embedded, giving the bolt a tendency to assume a slanting or bent position in the hole through the two pieces $c$ and $d$ united thereby. Fig. 4 is a plan of a hexagon nut formed with a similar tooth.

In Fig. 5 I represent a washer having teeth upon its upper and lower surfaces and operating in the manner before described, so that when the bolt-head or the nut is forced firmly against the same the teeth will be embedded into the surfaces with which they come in contact, and the strain will tend to bend the bolt, as aforesaid. The teeth on this washer may be back to back upon the surfaces at one side only of the hole in the washer, or the teeth upon one surface of the washer may be equidistant, while the teeth on the other surface of the washer are grouped together.

Fig. 6 shows a bolt with nut having two teeth, $a$, which are also shown in the plan.

In Fig. 7 the teeth are shown close together, so as to produce the desired one-sided or canting and binding or bending tendency.

Fig. 8 illustrates the invention as applied to the under side of the head of a screw-bolt. Fig. 9 is plan of same, and Fig. 10 a plan of the under side of the square head of a similar screw-bolt.

The bolts, nuts, and washers made according to this invention may be made of steel; but I find that they may advantageously be made of iron case-hardened on the tooth side, and I thus cheapen the manufacture. I prefer in all cases to make the short side of the tooth as vertical as possible, or, if the manufacture admits of it, even undercut, so as to give the best possible gripe and to enable it to embed itself well.

It is to be understood that in cases where the bolt-head is confined so that it will not turn the washer or nut is to be provided with the teeth, as aforesaid. If the nut is in a confined position, so that it cannot turn, and the bolt is revolved in screwing up the parts, then the teeth should be on the under side of the bolt-head, and they will be embedded into the surface into which they come in contact, and the tendency to bend the bolt itself will cause the pressure upon the teeth in the manner before described, and if the pressure is sufficient the bolt will be bent or sprung.

I am aware that washers that are thicker on one side than the other have been used with bolts, so that, the bearing being at one side, the tendency of the strain was to bend the bolt. With my improvement there is a tendency to bend or spring the bolt; but, the bearing being principally upon beveled or pawl-shaped teeth at one side of the bolt, the strain tends to embed the points of the teeth into the adjacent surface, and thus hold the points of the teeth and prevent the parts turning back or unscrewing.

I claim as my invention—

1. The combination, with a screw-bolt, of a rigid beveled or pawl-shaped tooth or teeth at one side only of the bolt, and projecting against the bearing-surface for the head or nut, substantially as specified, whereby the strain in tightening the bolt tends to bend or spring such bolt and to force the points of the teeth into the surface upon which they rest, substantially as set forth.

2. The combination, with a screw-bolt, of a rigid beveled or pawl-shaped tooth or teeth at one side only of the screw-head of the bolt or nut, and projecting from and forming part of said head and bearing against the surface of the parts clamped, substantially as specified, whereby the strain in tightening the bolt tends to bend or spring such bolt and to force the points of the teeth into the surface upon which they rest, preventing the loosening or unscrewing of the head, substantially as set forth.

3. The combination, with a bolt or nut, of a washer to go between the screw-head and the parts being clamped, said washer having three or more equidistant teeth on one side and several fine teeth on a portion of the other side, substantially as set forth.

JEREMIAH COWDY.

Witnesses:
 CHAS. BERKLEY HARRIS,
 JOHN DEAN,
 Both of No. 17 Gracechurch Street, London.